United States Patent [19]

Olsen et al.

[11] Patent Number: 4,744,692
[45] Date of Patent: May 17, 1988

[54] SPLIT-TAPERED JOINT CLAMPING DEVICE

[75] Inventors: Max J. Olsen, North Huntingdon; John F. Schwartz, Jr., Pittsburgh, both of Pa.

[73] Assignee: The United States of America as represented by the United States Department of Energy, Washington, D.C.

[21] Appl. No.: 99,802

[22] Filed: Sep. 22, 1987

[51] Int. Cl.⁴ ............................ B25G 3/20; F16B 2/14
[52] U.S. Cl. ................... 403/374; 403/409.1; 299/93
[58] Field of Search ............... 403/374, 409.1; 299/93; 407/104, 105, 108, 94, 49

[56] References Cited

U.S. PATENT DOCUMENTS

| | | | |
|---|---|---|---|
| 292,421 | 1/1884 | DuBois | 238/27 |
| 2,735,519 | 2/1956 | Frischmann | 403/381 |
| 3,138,847 | 6/1964 | Berry, Jr. | 407/49 X |
| 3,529,859 | 9/1970 | Garczynski | 403/83 |
| 3,633,949 | 1/1972 | Pfluger | 403/343 |
| 3,672,710 | 6/1972 | Kroop | 403/252 |
| 3,997,951 | 12/1976 | Williscraft | 407/105 |
| 4,057,294 | 11/1977 | Krekeler | 299/93 |
| 4,381,578 | 5/1983 | Glejf | 16/94 D |

*Primary Examiner*—Andrew V. Kundrat
*Attorney, Agent, or Firm*—William H. Randolph; Judson R. Hightower; Richard E. Constant

[57] ABSTRACT

This invention relates to a clamping device for removably attaching a tool element to a bracket element wherein a bracket element is disposed in a groove in the tool and a clamping member is disposed in said groove and in engagement with a clamping face of the bracket and a wall of the groove and with the clamping member having pivot means engaging the bracket and about which the clamping member rotates.

8 Claims, 1 Drawing Sheet

SPLIT-TAPERED JOINT CLAMPING DEVICE

The Government has rights in this invention pursuant to Contract No. DE-AC11-76PN00014 awarded by the U.S. Department of Energy.

BACKGROUND OF THE INVENTION

This invention relates to a clamping device for removably attaching a tool element to a bracket element and, more specifically, to an improvement in a split-tapered type joint. There are various constructions known in the prior art for securing one body to another with the use of a wedge-shaped part situated in a groove. One such example is shown by U.S. Pat. No. 3,633,949 to Pfluger. That patent shows a device for securing a switch cam to a cam drum which has a groove for the reception of the switch cam. The switch cam is clamped to the side wall of the groove under the action of a screw. A wedge-shaped part cooperates with a clamping piece threadably tightened by means of the screw. The clamping piece is arranged adjacent the wedge-shaped part in the groove to hold the switch cam therein.

SUMMARY OF THE INVENTION

One object of the present invention is to provide a device for rigidly attaching or securing existing tool elements which have been manufactured with relatively loose machining tolerances. Such an improved device can be readily installed and removed, as required, according to the present invention.

According to another aspect of the present invention, I provide a device for securing a first body such as a bracket element to a second body such as a tool element. The combination according to the present invention includes the provision in the second body or tool element of a groove means having first and second opposed inner walls. The first body or bracket element is disposed in the groove in engagement with the first wall. The first body also is provided with a clamping face spaced from and angularly disposed with respect to the second inner wall of the groove. Further, a clamping member is provided having a portion thereof disposed in the groove with one face thereof in engagement with the second inner wall of the groove and another clamping face being disposed in engagement on the clamping face of the first body. Furthermore, I provide a tightening means extending through aligned openings in the clamping member and the first body and being connected to the second body for tightening the clamping member against the first and second body. The clamping member includes a pivot means engaging the first body and about which said clamping member rotates as said tightening means is tightened.

According to another aspect of the present invention, the clamping faces of the first body or bracket element and the clamping member are metal-plated to reduce friction.

It should be understood that other objects and advantages of the present invention will be readily appreciated by reference to the following detailed description when considered in connection with the accompanying drawings.

DRAWINGS

DESCRIPTION OF THE PREFERRED EMBODIMENT

Figure 1:
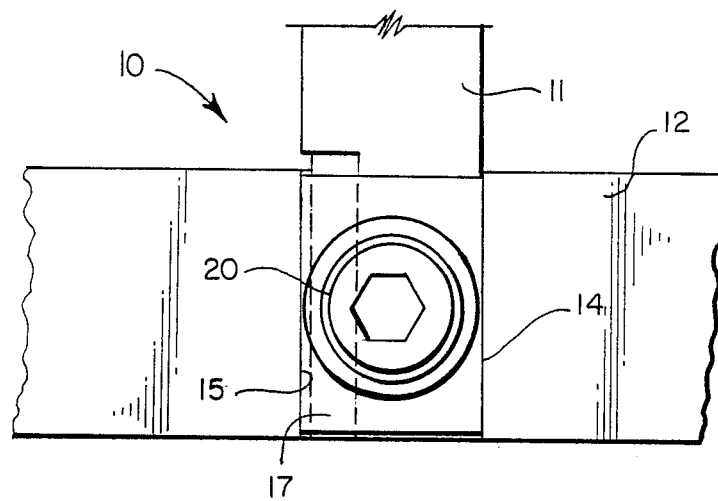
FIG. 1 is a fragmentary top view of an embodiment of the present invention.
Figure 2:
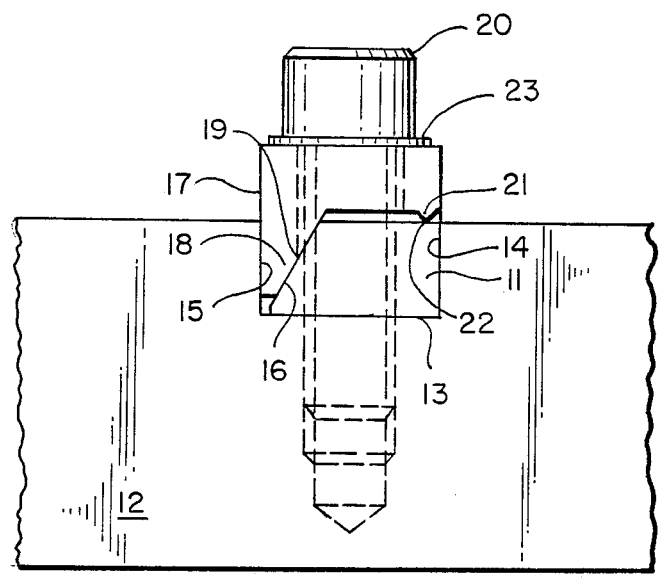
FIG. 2 is a side view of the device of FIG. 1.
Figure 3:
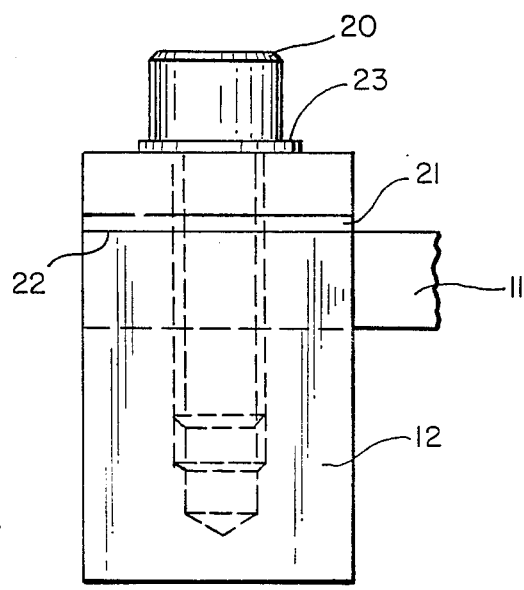
FIG. 3 is an end view of the device of FIG. 1.

Referring to the drawings, the number 10 denotes a device for securing a first body 11 to a second body 12. In the drawings, the first body 11 is a bracket element and the second body 12 is a tool element. As best illustrated in FIG. 2, the second body 12 is provided with a groove means 13 having two opposed inner walls 14 and 15. The first body 11 is disposed in groove 13 in engagement with wall 14 as best seen in FIGS. 1 and 2. Further, the first body 11 has a clamping face 16, as seen in FIG. 2 which is spaced from and angularly disposed with respect to wall 15. Device 10 also has a clamping member 17 with a portion 18 disposed in the groove 13. One face of clamping member portion 18 is in engagement with wall 15 and another clamping face 19 is in engagement with the clamping face 16 of the first body 11. Device 10 further comprises a tightening means such as clamp screw 20 which extends through aligned openings provided in clamping member 17 and the first body 11. As best seen in FIG. 2, the clamp screw is connected to the second body 12 by means of threads for tightening the clamping member 17 downwardly against the first and second bodies. As best illustrated in FIG. 2, the clamping member 17 includes a pivot means 21 for engaging the first body 11 at point 22. When tightening means 20 is tightened, the clamping member 17 rotates on the pivot means 21 about the contact point 22. Moreover, depending upon the clearances and tolerances of the various parts of device 10, the clamping member 17 may slide laterally at contact point 22.

According to the embodiment of the present invention shown in the drawings, a washer 23 can be provided under the head of clamp screw 20.

It should be understood that the materials of construction of device 10 or its various parts can vary depending upon the specific clamping application. For certain applications, device 10 should be constructed entirely of stainless steel materials so as to obtain optimum corrosion resistance. Moreover, a precipitation hardenable type stainless steel is preferred for the device 10 to obtain the best differential thermal expansion match between the various elements of the device. It should also be understood that the overall size and design configuration of the elements of device 10 are influenced by the size of the associated tool element 12 or other parts to be secured. As indicated above, a pivot means 21 is incorporated into the clamping member 17 to reduce the contact surface area in the lateral movement direction of the clamping member 17 relative to the bracket element 11. This minimizes the frictional resistance between these elements during clamping operations. The angle of the tapered joint depicted as surfaces 16 and 19, and the inclusion of the pivot means 21, are used to obtain maximum clamping action with a minimum of clamping force. It should also be understood that surfaces 16 and 19 may be chrome-plated to further reduce frictional resistance.

In operation, it should be understood that when the device 10 is assembled, the clamping force due to the tightening of clamp screw 20 drives the clamping member portion 18 down along the tapered contact surface 16 and against the mating slot edge 15 in tool element 12. Then the force drives the first body or bracket element 11 against its mating slot edge 14. This action moves to rigidly clamp the first body or bracket element 11 to the associated second body or tool element 12 and makes the device of the present invention especially useful when mounting existing tool elements which have been fabricated to loose tolerances.

While we have shown and described preferred embodiments of the present invention, it should be understood that modifications may be made in the construction and arrangement of parts without departing from the spirit and scope of the invention.

We claim:

1. A device for securing a first body to a second body comprising, in combination:
   a first body;
   a second body provided with groove means having first and second opposed inner walls;
   said first body being disposed in said groove means in engagement with said first wall and having a clamping face spaced from and angularly disposed with respect to said second wall;
   a clamping member having a portion disposed in said groove with one face thereof in engagement with said second wall and another clamping face in engagement with said clamping face on said first body;
   a tightening means extending through aligned openings in said clamping member and said first body and being connected to said second body for tightening said clamping member against said first and second body;
   and said clamping member including a pivot means engaging said first body and about which said clamping member rotates as said tightening means are tightened.

2. The invention of claim 1 wherein said clamping faces of said first body and said clamping member are metal-plated.

3. The invention of claim 1 wherein said tightening means is a machine screw threadingly secured to said second body.

4. The invention of claim 1 wherein said first body is a bracket element and said second body is a tool element.

5. The invention of claim 4 wherein said device is fabricated from stainless steel and the clamping faces of said bracket element and said tool element are chrome-plated.

6. A clamping device for removably attaching a tool element to a bracket element, said device comprising:
   said tool element has a slot therein wherein said bracket element is received;
   a clamp body means having a wedge portion in said slot;
   a holding means to hold said wedge portion in said slot in wedging engagement with said bracket element and said tool element;
   said holding means including a clamping screw extending through openings in said clamp body means and said bracket element;
   and, said clamp body means having a pivot means so that said clamp body means pivots thereabout on said bracket element as said clamping screw is tightened to force said wedge portion into engagement with said bracket element in said slot.

7. The invention of claim 6 wherein said clamping screw is threadingly engaged with said tool element.

8. The invention of claim 7 wherein said slot in said tool element and said bracket element have relatively loose tolerances.

* * * * *